United States Patent
Hsu et al.

(10) Patent No.: US 7,536,088 B2
(45) Date of Patent: May 19, 2009

(54) METHOD OF AUTHORING DVD VIDEO RECORD ON AN EXTERNAL STORAGE DEVICE

(75) Inventors: Wei Hsu, Hsintien (TW); Chia-Ho Lin, Taoyuan (TW)

(73) Assignee: Cyberlink Corp., Shindian, Taipei (TW)

( * ) Notice: Subject to any disclaimer, the term of this patent is extended or adjusted under 35 U.S.C. 154(b) by 1303 days.

(21) Appl. No.: 10/263,392

(22) Filed: Oct. 3, 2002

(65) Prior Publication Data

US 2004/0067044 A1 Apr. 8, 2004

(51) Int. Cl.
*H04N 5/00* (2006.01)

(52) U.S. Cl. .................... 386/125; 386/46; 386/52; 386/126; 715/731

(58) Field of Classification Search ............ 386/46, 386/52, 55, 64, 83, 95, 96, 98, 124, 97 N, 386/25, 126; 348/423, 473; 717/100–116, 717/136, 149; 369/47.13, 83–85; 715/719, 715/731

See application file for complete search history.

(56) References Cited

U.S. PATENT DOCUMENTS 6,044,199 A * 3/2000 Oda et al. .............. 386/98
6,453,459 B1 * 9/2002 Brodersen et al. ........ 717/100
2002/0180803 A1 * 12/2002 Kaplan et al. ........... 345/810

FOREIGN PATENT DOCUMENTS

EP 0877377 A1 * 11/1998

OTHER PUBLICATIONS

Jim Taylor, DVD Demystified, 2001, McGraw-Hill, Second Edition, 23, 223,224, 255, 495, 500, 501, 531, 532, 533, 535, 536, 543.*
English language translation of abstract of JP 2002-245752.
English language translation of abstract of JP 2001-339689.
English language translation of abstract of JP 2002-230941.
English language translation of abstract of JP 2000-222861.
English language translation of abstract of JP 2000-215647.
English language translation of abstract of JP 2002-247506.
English language translation of abstract of JP H5-81773.
English language translation of abstract of JP H6-60611.

* cited by examiner

*Primary Examiner*—Thai Tran
*Assistant Examiner*—Mishawn Dunn
(74) *Attorney, Agent, or Firm*—Thomas, Kayden, Horstemeyer & Risley

(57) ABSTRACT

The present invention provides a method of authoring a DVD video recording on an external storage device, the steps of this method comprise; receiving authoring data, the authoring data is used to modify a recording file. The recording file records the authoring of the DVD video recording. Then, modifying the recording file according to the received authoring data on an external storage device until all authoring operations are done. Finally, burning the recording file on a specific area of the DVD.

21 Claims, 3 Drawing Sheets

METHOD OF AUTHORING DVD VIDEO RECORD ON AN EXTERNAL STORAGE DEVICE

BACKGROUND OF THE INVENTION

1. Field of the Invention

This invention generally relates to the field of video record processing. More particularly, the present invention relates to a method of DVD video record authoring on an external storage device.

2. Description of the Prior Art

Due to the change in science and technology with each passing day, the capacity of a compact disk (CD) is not enough for data storage within the last few years. Thus, the leading manufacturers are looking for a new standard in storage media, and expect to overcome the limitations of the present CD. Accordingly, the leading manufacturers propose a new generation of the CD standard, thus the DVD (digital versatile disc) has been presented to the public.

Owing to the capability and improvement of computer processing data, it is a result in that the capacity of the present CD is insufficient. The presentation of DVD can be the solution to resolve this problem. The DVD+RW is one of the rewritable DVD specifications, and is used for the purpose of consumer electric products and data saving. The DVD provides a huge capacity for the user, in recording high quality multi-media data thereon.

So far, the well-known purpose of a DVD is applied to produce DVD video, and provides additional specifications and capabilities, for examples: multi-subtitle, multi-angle, aspect ratio, multi-audio, Dolby digital, region code and so on.

Due to the evolution of burner devices, the DVD+RW burner and the application software provides the possibility of editing DVD video recording by a general user. However, when the user produces a DVD video recording, the DVD is allocated to two different areas, the VR data area (video record) and the VR authoring area. The VR authoring area is located on a specific region of the DVD, and is used to record the authoring information, for example, the connections between assets, the interaction functions, instruction code, and user menu. Therefore, the VR authoring area of the DVD will be rewritten continuously while the user is authoring.

Although the rewritable DVD generally allows the user to rewrite many times, but according to the foregoing situation this causes obvious differences in the rewrite frequency of both areas. Furthermore, the VR authoring area has to be located upon a specific location of the DVD. Thus, while the rewrite frequency of the VR authoring area exceeds the restriction, this means that even though the VR data area is available, but the DVD still cannot be used in the DVD video burning process.

SUMMARY OF THE INVENTION

In accordance with the background of the invention, accordingly, the present invention provides a method of authoring a DVD video recording on an external storage device to overcome the disadvantages in the prior art.

According to the foregoing objects, the present invention provides a method for authoring a DVD video recording on an external storage device, the steps of this method are comprised of, receiving the authoring data and using the authoring data to modify a recording file. The recording file records the authoring of the DVD video recording. Then, the recording file is modified according to the received authoring data on an external storage device until all authoring operations are done. Finally, burning the recording file on a specific area of the DVD.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The preferred embodiment of this invention will now be described in greater detail. Nevertheless, it should be noted that the present invention can be practiced in a wide range of other embodiments besides those explicitly described, and the scope of the present invention is expressly not limited except as specified in the accompanying claims.

The present invention provides a method for authoring a DVD video recording on an external storage device; the steps of this method comprise; receiving the authoring data, wherein the authoring data is used to modify a recording file. The recording file records the authoring of the DVD video recording. Then, modifying the recording file according to the received authoring data on an external storage device until all authoring operations are done. Finally, burning the recording file on a specific area of a DVD.

Figure 1:
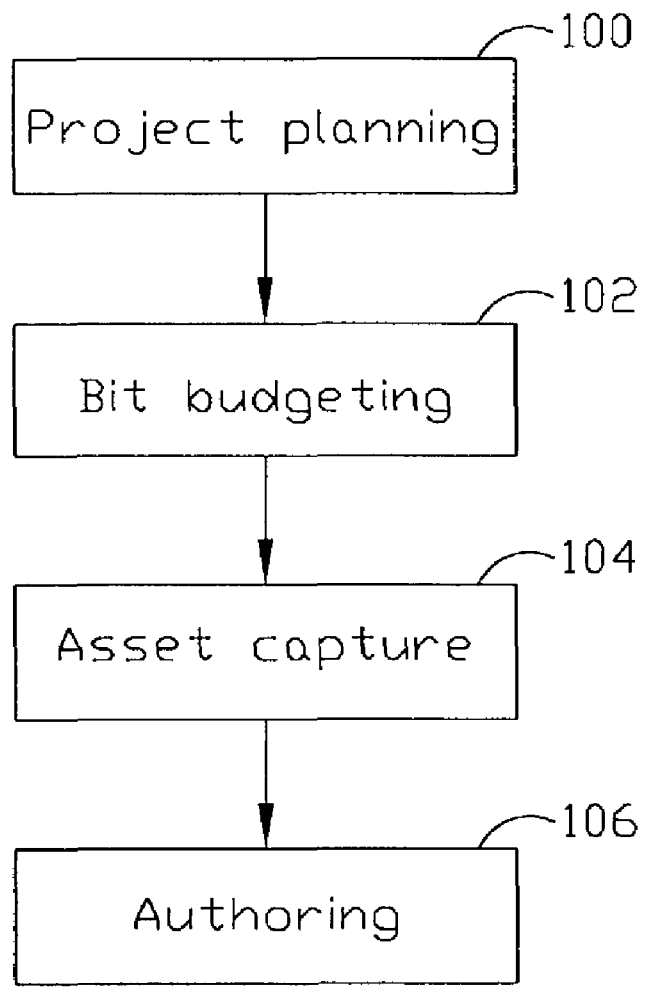
FIG. 1 shows the steps of producing a DVD video record.

In general, the production of a DVD video can be divided into four steps, as shown in FIG. 1: Project Planning 100, Bit Budgeting 102, Asset Capture 104, and Authoring 106.

Therein, the project planning 100 is in preparation and planning, firstly the whole project is defined. The project is probably not just an ordinary movie, but maybe an interaction video that includes multiple options, multi-angles and a different script of the proceeding story. It begins to establish the production flow or planning module when the interaction level of the whole project structure is decided. Besides, the project planning figures out how many assets have to be prepared and captured. The type of asset probably includes a movie, sound, figures and subtitles.

The video maker has to proceed with bit budgeting 102 before the capture of assets 104, in accordance with the capacity of a DVD to decide on a balance between the time period, quantity and quality of these assets. Next is the assets capture 104, in general, the assets for a DVD can be classified in several types: video clips, sound tracks and subtitles. The standard format of video clips of a DVD is MPEG. The specification of sound is PCM, Dolby Digital (NTSC system standard) and MPEG (PAL system standard). The subtitles are photographs.

Figure 2:
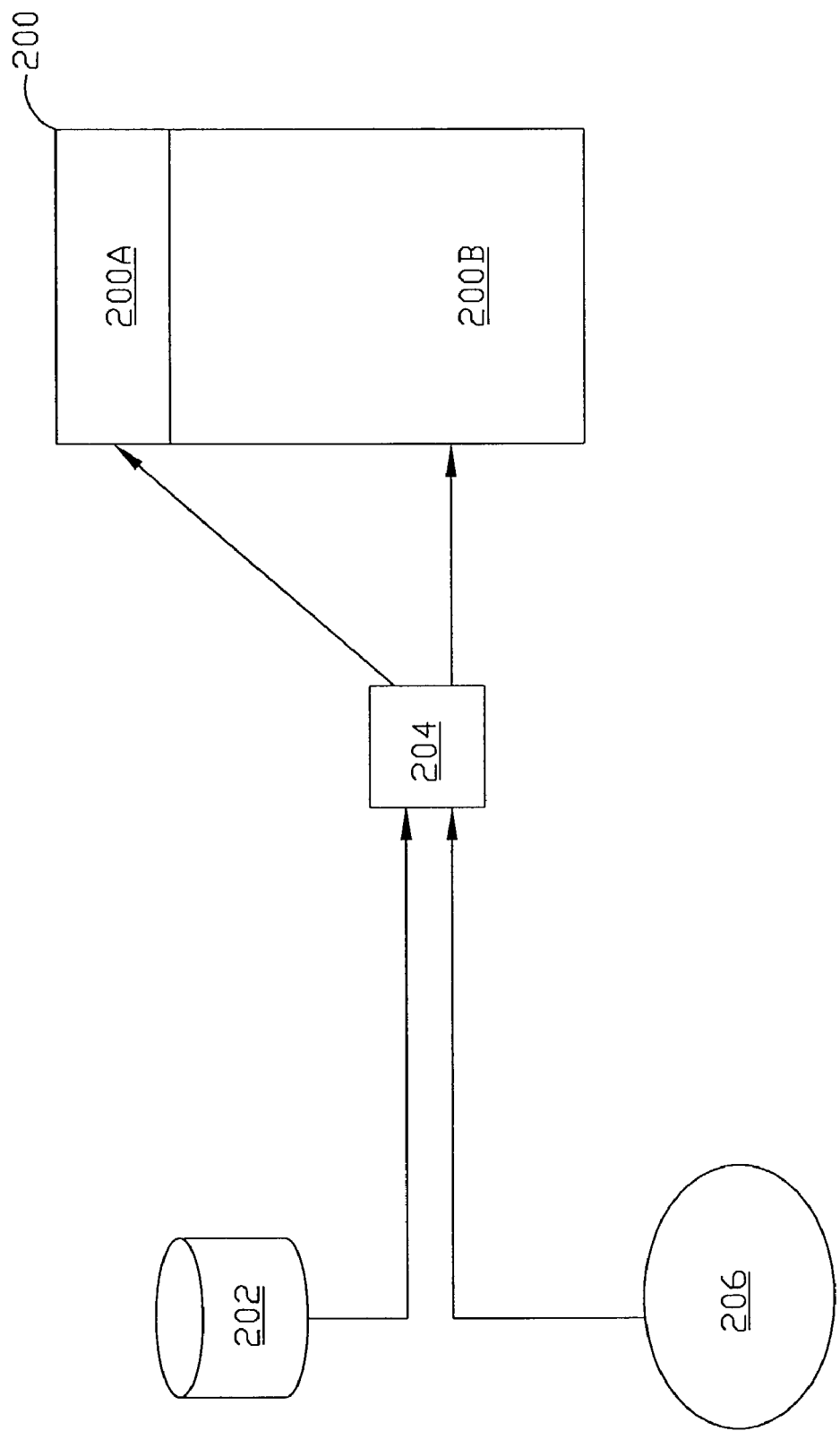
FIG. 2 is the preferred embodiment of the present invention.

FIG. 2 is a preferred embodiment of the present invention, wherein the DVD 200 is used to record DVD video. Therefore, the DVD 200 can be divided into VR (video record) authoring area 200A and VR data area 200B. The foregoing assets 206 are captured, and then burned on the VR data area 200B of the DVD 200 through a burner device 204. At present, there are no connections set between these assets that are burned on the DVD 200.

Next, the authoring 106 include the steps of: asset assembly, interactivity editing and multiplexing. The asset assembly begins to set the connected relation of all assets after capturing the necessary assets. Assembled assets are called VOB (video object).

In addition, the foregoing authoring 106 further includes the menu editing. Besides, the authoring action will be recorded on several authoring record files with specific file names respectively. According to the well-known procedure, the authoring record files are burned on the VR authoring area 200A of the DVD 200. And each time the authoring record files are being updated by a new authoring command, and then the updated record files are re-burned on the VR authoring area 200A. Therefore, there is an extreme need to frequently re-burn the VR authoring area 200A during authoring. As a result, the number of rewrite times in the VR authoring area 200A is more than the number of rewrite times in the VR data area 200B.

Therefore, the present invention uses an external storage device 202 to simulate the VR authoring area 200A, wherein the external storage device 202 can be a hard disk, memory or magnetic tape, which is suitable for data changing and saving rapidly thereon. The external storage device 202 is a hard disk device in this preferred embodiment. The external storage device 202 provides the same authoring record files, which are saved on the VR authoring area 200A, thus, the operation of updating the authoring record files can be done on the external storage device 202. The authoring record files that are saved on the external storage device 202 will be transferred and saved on the VR authoring area 200A of the DVD 200 through the burner device 204 after the whole authoring is finished.

According to the description above, the present invention provides a method for authoring a DVD video recording on the external storage device 202. It not only avoids burning the data upon the VR authoring area 200A of the DVD 200 frequently, but also expends the life of the DVD 200 and increases the speed of authoring.

Figure 3:
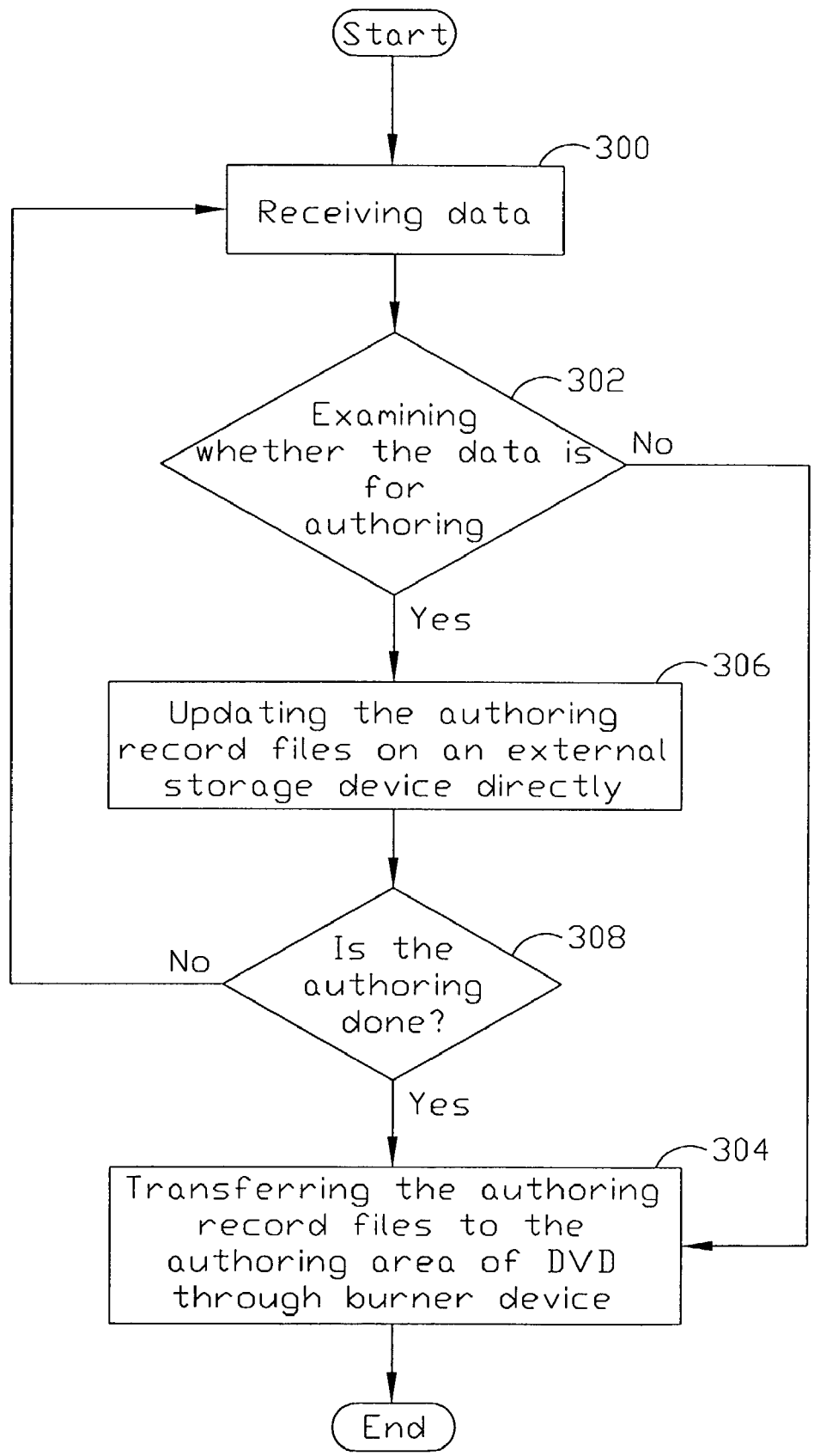
FIG. 3 shows the flow chart of the preferred embodiment of the present invention.

Within FIG. 3 is shown the flow chart of this embodiment. First, receiving data 300, and then examining whether the data is authoring data 302. If the received data is not authoring data, then the received data will be burned on the VR data area of a DVD through a burner device 304.

If the received data contains authoring data, then an update of the authoring record files on external storage device directly 306 is performed until the whole authoring 308 is done. After that, the transfer of simulated authoring record files from the external storage device to the VR authoring area of DVD through a burner device 304 is completed.

Although specific embodiments have been illustrated and described, it will be obvious to those skilled in the art that various modifications may be made without departing from what is intended to be limited solely by the appended claims.

What is claimed is:

1. A method of authoring DVD video record on an external storage device, the steps of said method comprising:

authoring at least one asset on a video record (VR) data area of a CD media;

receiving an authoring datum during the authoring operation;

updating at least one authoring record file on an external storage device according to the received authoring datum, wherein the at least one authoring record file records the authoring operation of a DVD video recording and the authoring record file comprises authoring information of connections between assets and a user menu;

determining whether the authoring operation is done; and if the authoring operation is determined to be done, transferring and saving said authoring record file to a video record (VR) authoring area of the CD media, the VR authoring area being distinct from the VR data area of the CD media.

2. The method of authoring DVD video record on an external storage device according to claim 1, wherein the type of said CD media is rewritable.

3. The method of authoring DVD video record on an external storage device according to claim 1, wherein said CD media is DVD.

4. The method of authoring DVD video record on an external storage device according to claim 3, wherein said external storage device is selected from a group consisting of a memory, a hard disk, and a magnetic tape.

5. The method of authoring DVD video record on an external storage device according to claim 3, wherein said step of saving said record on said DVD is using a burner device.

6. The method of authoring DVD video record on an external storage device according to claim 1, wherein the authoring record files frequently updated data.

7. The method of authoring DVD video record on an external storage device according to claim 1, wherein if the authoring operation is not done, returning to the step for receiving other data.

8. The method of authoring DVD video record on an external storage device according to claim 1, wherein the asset comprises video clips, sound tracks and subtitles.

9. A method of authoring a DVD video record, the method comprising steps of:

authoring at least one asset on a video record (VR) data area of a DVD;

simulating a video record authoring area of the DVD on an external storage device, comprising steps of:

storing an authoring record file on the external storage device;

receiving an authoring datum during the authoring operation;

updating an authoring record file stored on the external storage device according to the received authoring datum, wherein the authoring record file comprises authoring information of connections between assets and a user menu;

receiving an indication that the authoring operation is complete; and transferring the authoring record file on the external storage device from the external storage device to a video-record authoring area of a DVD after receiving an indication that the authoring operation is complete; and saving the transferred authoring record file to the video record authoring area of the DVD; wherein the VR authoring area being distinct from the VR data area of the CD media.

10. The method of claim 9, wherein the type of said CD media is rewritable.

11. The method of claim 9, wherein said CD media is DVD.

12. The method of claim 11, wherein said external storage device is selected from a group consisting of a memory, a hard disk, and a magnetic tape.

13. The method of claim 11, wherein said step of saving said record on said DVD is using a burner device.

14. The method of claim 9, wherein the authoring record file comprises frequently updated authoring data.

15. The method of claim 9, returning to the step for receiving other data when no indication that the authoring operation is complete has been received.

16. A method of authoring a DVD video record, the method comprising steps of:
- simulating a video record (VR) authoring area of a DVD on an external storage device;
- receiving an authoring datum during an authoring operation;
- updating an authoring record file stored on the external storage device according to the received authoring datum, wherein the authoring record file comprises authoring information of connections between assets and a user menu;
- transferring the authoring record file on the external storage device from the external storage device to a video-record authoring area of a DVD; and
- saving the transferred authoring record file to the video record authoring area of the DVD, the VR authoring area being distinct from a VR data area of the DVD, wherein at least one asset is authored on the VR data area.

17. The method of claim 16, wherein the DVD is rewritable.

18. The method of claim 16, wherein said saving the transferred authoring record file to the video record authoring area of the DVD comprises using a burner device.

19. The method of claim 18, wherein said external storage device is selected from a group consisting of a memory, a hard disk, and a magnetic tape.

20. The method of claim 16, wherein the transferring step occurs in response to receiving an indication that the authoring operation is complete.

21. The method of claim 16, returning to the step for receiving other data in response to receiving an indication that the authoring operation is not complete.

* * * * *